(12) United States Patent
Ranade (10) Patent No.: US 7,693,880 B1
(45) Date of Patent: Apr. 6, 2010

(54) MIRRORED STORAGE AT THE FILE SYSTEM LEVEL

(75) Inventor: Dilip Madhusudan Ranade, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 558 days.

(21) Appl. No.: 10/840,552

(22) Filed: May 6, 2004

(51) Int. Cl.
G06F 12/00 (2006.01)
G06F 17/30 (2006.01)

(52) U.S. Cl. .............................. 707/203; 707/8; 707/10; 707/204

(58) Field of Classification Search ................ 707/1–10
See application file for complete search history.

(56) References Cited

U.S. PATENT DOCUMENTS

| | | | |
|---|---|---|---|
| 5,511,177 A * | 4/1996 | Kagimasa et al. ........... | 711/114 |
| 5,909,540 A * | 6/1999 | Carter et al. ................... | 714/4 |
| 6,157,935 A * | 12/2000 | Tran et al. ................... | 715/503 |
| 6,530,035 B1 * | 3/2003 | Bridge ........................... | 714/6 |
| 6,728,831 B1 | 4/2004 | Bridge | |
| 6,847,984 B1 * | 1/2005 | Midgley et al. ............. | 707/204 |
| 6,880,102 B1 | 4/2005 | Bridge | |
| 6,889,249 B2 * | 5/2005 | Miloushev et al. .......... | 709/213 |
| 6,928,467 B2 * | 8/2005 | Peng ........................... | 709/219 |
| 7,146,524 B2 * | 12/2006 | Patel et al. .................... | 714/6 |
| 2005/0066095 A1 * | 3/2005 | Mullick et al. .............. | 710/200 |

* cited by examiner

Primary Examiner—Hosain T Alam
Assistant Examiner—Shew-Fen Lin
(74) Attorney, Agent, or Firm—Meyertons, Hood, Kivlin, Kowert & Goetzel, P.C.

(57) ABSTRACT

A file system includes a plurality of entries, wherein each entry is configured to store an indication of data block locations corresponding to a specified file, and wherein each entry is further configured to store an indication of mirrored data block locations corresponding to the specified file. Each entry may include one or more dirty indicators to identify out-of-sync data blocks. In yet another embodiment, the system may be configured to resynchronize a plurality of instances of data blocks depending upon dirty indicators corresponding to the plurality of instances of data blocks.

23 Claims, 5 Drawing Sheets

MIRRORED STORAGE AT THE FILE SYSTEM LEVEL

BACKGROUND OF THE INVENTION

1. Field of the Invention

This invention relates to the field of data storage and, more particularly, to the mirroring of data.

2. Description of the Related Art

As computers and data processing services become more important to modern business, ensuring the reliability and availability of each individual component resource also becomes increasingly important. Specifically, the storage systems used to store and access data must be faster, cheaper, more fault-tolerant and accessible at all possible times.

One solution is to provide a volume manager operable to manage a plurality of data storage devices for a top-level file system. All the complexity of managing data across multiple devices may be handled by the volume manager, thereby providing the top-level file system with the illusion of a single, high-availability storage device.

For example, a volume manager may manage a mirrored pair of disk drives, wherein the same data is written to both disks. A mirrored pair of disk drives may provide for increased reliability, since in the event of a single disk drive failure, the mirrored disk drive is still operable to provide access to the data. Mirrored disk drives may also provide for increased data throughput, since each disk is capable of simultaneously executing a read or write access. Furthermore, the mirrored disk drives may be network devices located in different areas, thereby providing increased security against damage or theft at a single location.

However, a typical volume manager manages data at the volume level, rather than at a finer level of granularity. Accordingly, when a particular volume is mirrored, the data blocks corresponding to all files stored in that volume are mirrored, regardless of the importance (or desired storage quality) of each individual data file.

SUMMARY OF THE INVENTION

Various embodiments of a system and method for mirroring data at the file system level are disclosed. In one embodiment, a file system includes a plurality of entries, wherein each entry is configured to store an indication of data block locations corresponding to a specified file, and wherein each entry is further configured to store an indication of mirrored data block locations corresponding to the specified file.

In a further embodiment, each entry may include one or more dirty indicators to identify out-of-sync data blocks. In yet another embodiment, the system may be configured to resynchronize a plurality of instances of data blocks depending upon dirty indicators corresponding to the plurality of instances of data blocks.

In another embodiment, a system comprises a plurality of storage devices operable to store one or more files, wherein each file comprises one or more sets of one or more data blocks. A plurality of instances of a set of one or more data blocks are stored in the storage devices, wherein each of the plurality of instances of the set of data blocks is stored in a different one of the storage devices. The system further comprises a file system operable to manage the files, wherein the file system contains one or more inodes. Each of the inodes corresponds to a unique one of the files, wherein at least one inode contains a mirror pointer corresponding to the plurality of instances, and wherein the mirror pointer indicates a location of each of the plurality of instances.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
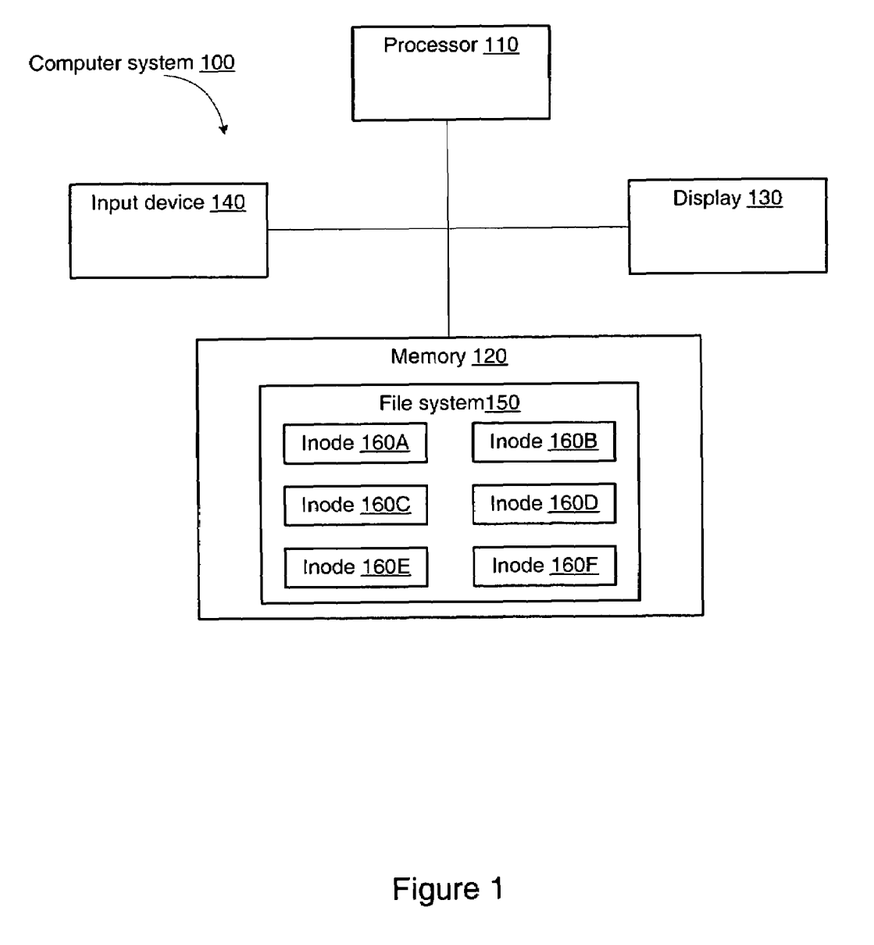
FIG. 1 is a block diagram of one embodiment of a computer system.

Turning now to FIG. 1, a block diagram of one embodiment of a computer system 100 is shown. Computer system 100 includes a processor 110 coupled to a memory 120, a display 130, and an input device 140. It is noted that computer system 100 may be representative of a laptop, desktop, server, workstation, terminal, or other type of system.

Processor 110 may be representative of any of various types of processors such as an x86 processor, a PowerPC processor or a CPU from the SPARC family of RISC processors. It is noted that in various embodiments computer system 100 may contain one or more processors 110.

Memory 120 may be representative of any of various types of memory, including DRAM, SRAM, EDO RAM, Rambus RAM, etc., or a non-volatile memory such as a magnetic media, e.g., a hard drive, flash memory or optical storage, for example. It is noted that in other embodiments, the memory 120 may include other types of suitable memory as well, or combinations of the memories mentioned above.

Display 130 may be representative of any of various types of displays, such as a liquid crystal display (LCD) or a cathode ray tube (CRT) display, for example. Input device 140 may be any type of suitable input device, as appropriate for a particular system. For example, the input device 140 may be a keyboard, a mouse, a trackball or a touch screen.

Memory 120 may contain a plurality of data structures which comprise a file system 150. File system 150 may be operable to contain and organize one or more files, which may in turn be created, destroyed, read, and written to by one or more applications executing on computer system 100. File system 150 may be an integrated component of an operating system, such as Microsoft Windows, Linux, Sun Solaris or Macintosh OS X.

In the illustrated embodiment, file system 150 contains one or more inodes 160A-160F (referred to generally as inodes 160). Each inode 160 is associated with a specific file contained in file system 150, and may contain various metadata related to the file, such as file name, file size, and access permissions. As will be described in further detail below, each inode 160 may also contain or point to one or more data structures which describe the location of associated file data on a plurality of storage devices. It is noted that file system 150 may contain any number of inodes 160 in accordance with the number of files stored in file system 150. File system 150 may further utilize one or more additional inodes 160 to store non-file data, such as system metadata and directory data.

Figure 2:
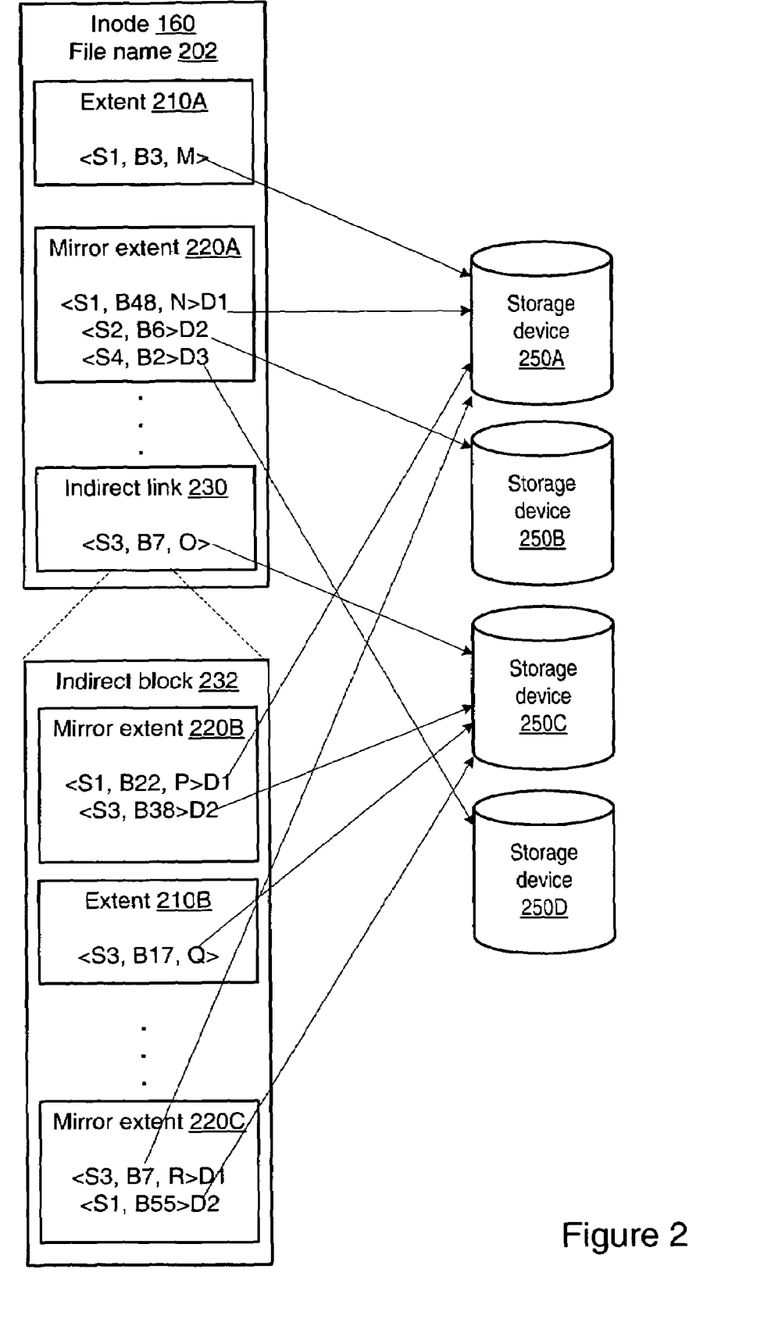
FIG. 2 is a block diagram illustrating aspects associated with one embodiment of an inode.

Turning now to FIG. 2, a diagram illustrating aspects associated with one embodiment of an inode 160 is shown. As described above, inode 160 may correspond to a specific file contained in file system 150, and may contain an associated file name 202. Each file in file system 150 may be broken up into one or more sets of one or more data blocks, with each set located on at least one of a plurality of storage devices 250A-250D (referred to generally as storage devices 250).

Storage devices 250 may comprise any type of non-volatile memory such as a hard drive, flash memory or optical storage, for example. Each storage device 250 may be operable to store and retrieve data from a given physical address in response to commands from a computer system 100. In one embodiment, storage devices 250 may be an array of similar disks connected to a computer system 100 by an internal data bus or by an external data bus such as Fibre channel or Gigabit Ethernet. Each storage device 250 in such an array may be operable to provide nearly identical characteristics with regard to storage size and access speeds. Alternatively, in another embodiment, each storage device 250 may be of a different type and operable to provide different storage characteristics. For example, in one embodiment two storage devices 250A and 250B may be local hard drives connected to a computer system 100 by an internal data bus, while a third storage device 250C may be an external hard drive connected to computer system 100 by a high speed external connection such as Firewire. Furthermore, a fourth storage device 250D may be a remote network storage device connected to computer system 100 by a network, such as a local area network (LAN) or the Internet.

It is noted that each type of storage device 250 described above may be best suited for a particular type of storage usage. For example, one or more local hard drives may be used by computer system 100 for high-speed data storage and retrieval for various applications, while an external Firewire drive may be used as a high-speed backup device or for a third mirror break-off, as will be described in further detail below. Furthermore, a remote network storage device may be used for long-term backup of data. It is additionally noted that, in one embodiment, file system 150 may be operable to address and access data from each type of device by utilizing a variety of drivers and a hardware-independent storage device interface. Accordingly, it is also noted that in various embodiments, the number and type of storage devices 250 may vary beyond the example given in FIG. 2.

As stated previously, a file corresponding to a given inode 160 may comprise one or more sets of one or more data blocks. One or more instances of each data block set may be stored on storage devices 250, such that each data block set may have zero, one, or more duplicate copies. In the illustrated embodiment, each data block set of the corresponding file is specified by an extent. More particularly, FIG. 2 illustrates extents 210A-210B (referred to generally as extents 210) which each specify the location of a data block set with only a single instance stored on storage devices 250. FIG. 2 further illustrates mirror extents 220A-220C (referred to generally as mirror extents 220) which each specify the locations of multiple instances of a data block set stored on storage devices 250.

In one embodiment, each extent 210 includes a multi-element data structure referred to as a "tuple." Each tuple lists the storage device 250 where an associated set of data blocks is stored, the starting address within the storage device 250 where the set of data blocks is located, and the number of blocks within the set. For example, as shown in FIG. 2, extent 210A contains a tuple indicating that a storage device S1 contains M blocks of data starting at address B3.

In the illustrated embodiment, each mirror extent 220 includes a plurality of tuples, with each tuple pointing to a specific location of a particular instance of an associated data block set, as described above. For example, as shown in FIG. 2, mirror extent 220A contains three tuples, pointing to duplicate instances of a set of N data blocks on storage devices S1, S2 and S4 at particular starting addresses. It is noted that in the illustrated embodiment, only one tuple per mirror extent 220 may contain the number of data blocks in the set.

In one embodiment, each instance of a data block set in a mirror extent 220 may also be associated with a dirty bit (e.g. D1-D3), which indicates if a write to the corresponding instance of the data block set has been initiated but not completed. It is noted that in one embodiment, each dirty bit may be part of an associated tuple or mirrored extent 220, while in another embodiment the dirty bits may be provided in a separate dirty bitmap data structure. It is also noted that in one embodiment file system 150 may utilize a journaling file system. In such an embodiment, the journaling file system may complement the dirty bits.

In the illustrated embodiment, inode 160 also contains an indirect link 230. Indirect link 230 indicates the location of an indirect block 232 on a storage device 250. Indirect block 232 may contain one or more extents 210, mirrored extents 220, and indirect links 230, thereby allowing a chain of indirect links 230 and indirect blocks 232 where extents 210 and mirror extents 220 may be stored. In alternate embodiment, the use of such indirect links may not be supported.

It is noted that, in accordance with the above description, each inode 160 may be operable to provide mirroring of selected data block sets (or extents) on multiple storage devices 250, thereby allowing file system 150 to provide file-level and extent-level mirroring of data. It is further noted that file system 150 may include certain access control mechanisms, such as serialized writes to file data and metadata updates during file transactions. Accordingly, file system 150 may be able to mirror data with less access control overhead than a volume-level mirroring system.

Furthermore, file system 150 may allow for the "tuning" of data within the file system to provide high reliability to data of critical importance, while minimizing the unnecessary mirroring of less important data. In one embodiment, an end user may indicate to file system 150 which data should be mirrored, and the number of replicas each file or data set should have Alternatively, in one embodiment, file system 150 may be configured to automatically adjust which files and data blocks are mirrored, and by how many replicas, based on data access patterns, preset data priority rules, file types, observed user preferences, or a combination thereof. For example, source code files in a development environment may be mirrored two or more times to prevent loss of data, while generated object code files, which may be easily regenerated from source files, may have only a single instance on storage devices 250. In another example, critical metadata used to organize files and directories may also be mirrored on multiple storage devices 250.

In addition, file system 150 may provide a mechanism to evenly distribute data reads across multiple storage devices 250 by providing a data read subroutine that randomly selects a particular instance of a set of data blocks to read, rather than repeatedly selecting data block instances off a single primary storage device 250. Alternatively, file system 150 may implement an algorithm that causes select data block instances to be read off the least used storage device 250, in order to better spread data accesses. In one implementation, after a specific storage device 250 has been selected by such an algorithm, file system 150 may cause subsequent reads of the data block set to be read from the same stored instance, thereby avoiding the creation of buffer caches with identical data.

It is noted that each inode 160 may contain or link to data structures other than extents 210 and mirror extents 220. For example, in one embodiment, one or more entries in an inode 160 may contain one or more tuples, wherein each tuple contains the starting and ending addresses of the set of data blocks stored on an associated storage device 250. Alternatively, a file system 150 may, in one embodiment, partition a file into data blocks of uniform size, and point to each data block with an associated block pointer.

It is additionally noted that similar mechanisms may also be applied to other types of file systems which do not utilize inodes 160. For example, in some embodiments, a file allocation table (FAT) may be utilized instead of inodes 160. A normal FAT comprises an array of blocks, wherein each FAT entry is associated with a storage location on a single storage device 250. Each FAT entry also contains a pointer to another FAT entry, which may be used to indicate the FAT entry associated with the next portion of the file, or which may be used to indicate the end of the file or other specialized block codes.

In one embodiment, the data mirroring mechanism described above may be adapted to a FAT-based file system by allowing each FAT entry to be associated with one or more physical locations on one or more storage devices 250. Alternatively, a FAT-based file system 150 may provide for file-level mirroring by providing two or more chains of FAT entries per file. In yet another embodiment, a FAT-based file system 150 may provide for one or more additional FATs for mapping additional FAT chains.

Figure 3:
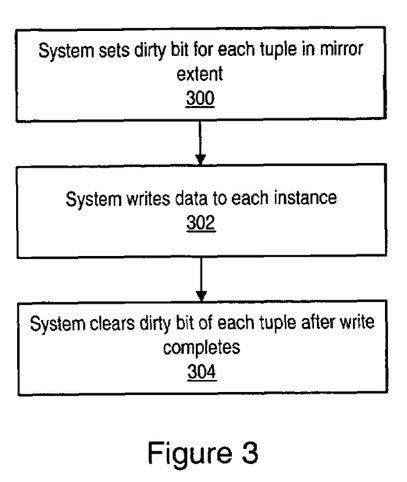
FIG. 3 is a flowchart illustrating one embodiment of a method for writing data to a mirror extent.

Turning now to FIG. 3, a flow chart of one embodiment of a method for writing data to a mirror extent 220 is shown. As described above, each tuple in a mirror extent 220 may be associated with an instance of a set of data blocks, and may have a dirty bit that indicates the status of a write to the instance. Accordingly, in step 300, upon initiation of a write, file system 150 sets a dirty bit associated with each instance of the set of data blocks, thereby indicating that a write to the associated instance has initiated, but has not completed.

In step 302, file system 150 begins overwriting each data block of each instance of the set of data blocks. In one embodiment, file system 150 may execute a synchronous write to the plurality of instances, wherein each write "blocks", or returns to a calling routine only when each write to every instance is complete. Alternatively, file system 150 may execute an asynchronous write to the plurality of instances, wherein the write subroutine returns to the calling routine immediately. In step 304, file system 150 may then clear the dirty bit of each tuple as the write to the corresponding instance completes.

It is noted that in one embodiment, the method described above may be applicable only to non-allocating writes, wherein data blocks are overwritten but no new data blocks are allocated. In such an embodiment, allocating writes and any associated metadata modifications may occur as part of a file transaction, which may be handled by a mechanism such as a journaling file system.

In one embodiment, file system 150 may be configured to utilize the dirty bits associated with a mirror extent 220 to resynchronize a storage device 250 following a connection outage. Specifically, one or more storage devices 250 may be temporarily inaccessible to file system 150 due to a failure such as a power outage or network failure. During such an outage, file system 150 may be unable to write data to the instances of one or more data blocks stored on the inaccessible storage device 250. However, in accordance with the method described above in FIG. 3, file system 150 may set the dirty bit of each modified data block instance on the disconnected storage device 250. Since a write to a disconnected storage device 250 cannot complete, the dirty bit associated with the data block instance remains set, thereby indicating that the instance is out of synch with other instances of the same data blocks.

Figure 4:
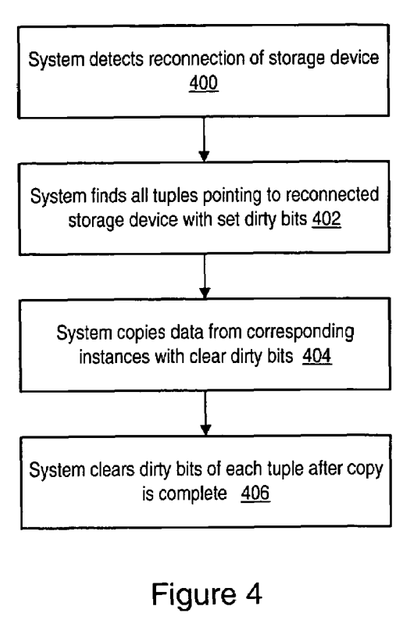
FIG. 4 is a flowchart illustrating one embodiment of a method for resynchronizing a reconnected storage device.

Accordingly, FIG. 4 shows a flow chart illustrating one embodiment of a method for resynchronizing a reconnected storage device 250. In step 400, file system 150 detects that a storage device 250 has reconnected. In one embodiment, file system 150 may be operable to receive an event-based message from an associated operating system that the storage device 250 has reconnected, while in another embodiment file system 150 may be operable to detect the resumption of a heartbeat signal from the storage device 250.

In step 402, file system 150 finds all tuples on all mirror extents 220 which point to the reconnected storage device 250, and which have set dirty bits. As described above, these set dirty bits may indicate that a write has been attempted to the associated instance, but not completed. Accordingly, in step 404 file system 150 overwrites the data block instances associated with such tuples by copying data from other instances in the associated mirror extents 220 with clear dirty bits. File system 150 may then clear the dirty bits associated with the tuples in 406, thereby bringing the reconnected storage device 250 back into synchronization with other storage devices 250.

Figure 5:
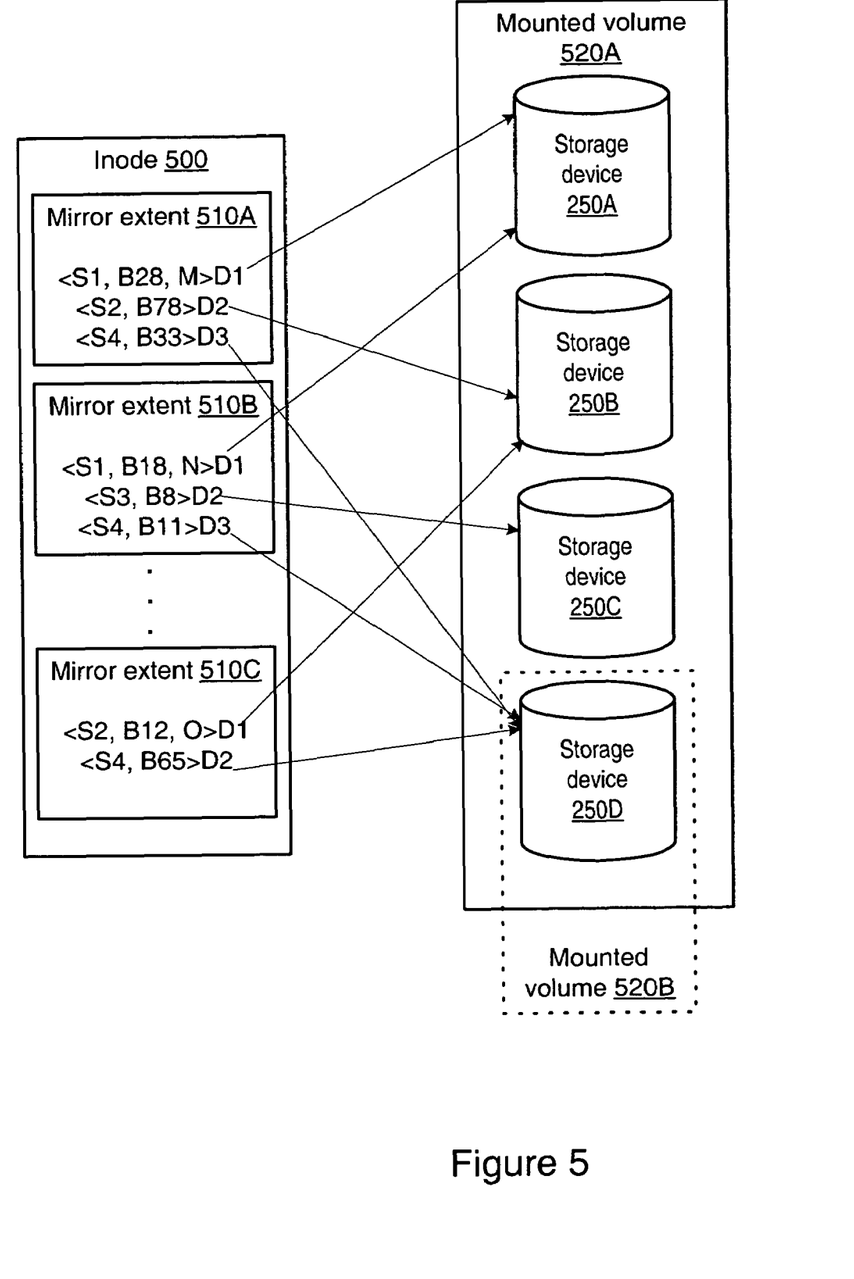
FIG. 5 is a block diagram of one embodiment of a third mirror break-off configuration.

Turning now to FIG. 5, a diagram of one embodiment of a third mirror break-off configuration is shown. A third mirror break-off allows for a snapshot of a storage volume to be created (i.e. "broken off"), accessed for various purposes such as data mining, and then efficiently resynchronized with the original volume. For example, an end user may wish to use various access-intensive data mining algorithms on an active database. Such intensive use of volume data may place unacceptable overhead on primary and backup volume copies (i.e., the first and second "mirrors") while archived backup copies may not preserve certain key data relationships, or may not provide sufficient data throughput for data mining algorithms. In comparison, a third mirror may easily be synchronized with current volumes, broken off (often as a separately mounted, read-only volume), analyzed, and resynchronized.

The data block-level mirroring mechanism described above may allow for a given subset of files or set of directories to easily undergo a third mirror break-off process. As illustrated in FIG. 5, a plurality of storage devices 250 may be mounted as a single mounted volume 520A. One or more inodes 500 corresponding to a file included in the third mirror break-off will include a mirror extent 510A-510C (referred to generally as mirror extents 510) for each set of data blocks in the file. As described above, in one embodiment each mirror extent may include a tuple and a dirty bit corresponding to an instance of a set of data blocks. However, as illustrated in FIG. 5, in addition to the one or more instances stored on storage devices 250A-C, each mirror extent 510 will also point to an instance of the set of data blocks stored on a separate storage device, e.g., 250D.

During the synchronized phase before the break-off, reads and writes of the instances stored on storage device 250D may proceed as normal. It is noted that prior to the break-off, various metadata that may be necessary for accessing the mirrored files, such as the superblock and various other directory data, may also be mirrored in storage device 250D.

During the break-off, file system 150 may set storage device 250D as a read-only device, and mount storage device 250D as a separate mounted volume 520B. Other processes, such as data mining processes, may thus be able to access the data on mounted volume 520B without interfering with regular access operations on mounted volume 520A.

Furthermore, any writes to the various sets of data blocks on volume 520A will cause dirty bits on the associated mirror extents 510 (corresponding to instances on storage device 250D) to be set, as described above in FIG. 3. Then, after mounted volume 520B has been processed as desired, storage device 250D may be unmounted, returned to a read/write setting by file system 150, and resynchronized with the rest of mounted volume 520A by the resynchronization method described in FIG. 4.

It is noted that in accordance with the system described above, a file and directory-level third mirror break-off may be created and resynchronized, thereby avoiding any unnecessary replication of data associated with mirroring an entire volume. Furthermore, including only selected files and directories in the third-mirror break-off may allow for a quicker, more efficient resynchronization of the third mirror, in comparison to a mirror of the entire volume. It is also noted that the number of storage devices 250 in both mounted volume 520A and 520B may vary in different embodiments, depending on the amount of data to be included in the third mirror break-off Turning now to FIG. 6, a flow chart of one embodiment of a method for migrating a mirror extent 160 is shown. In one embodiment, a mirror extent 160 may be migrated in response to detecting a hot spot. Specifically, file system 150 may be configured to determine that a storage device 250 is being accessed a disproportionate number of times (i.e. that it is "hot") in comparison to other storage devices 250 (which may be seen as relatively "cool").

Figure 6:
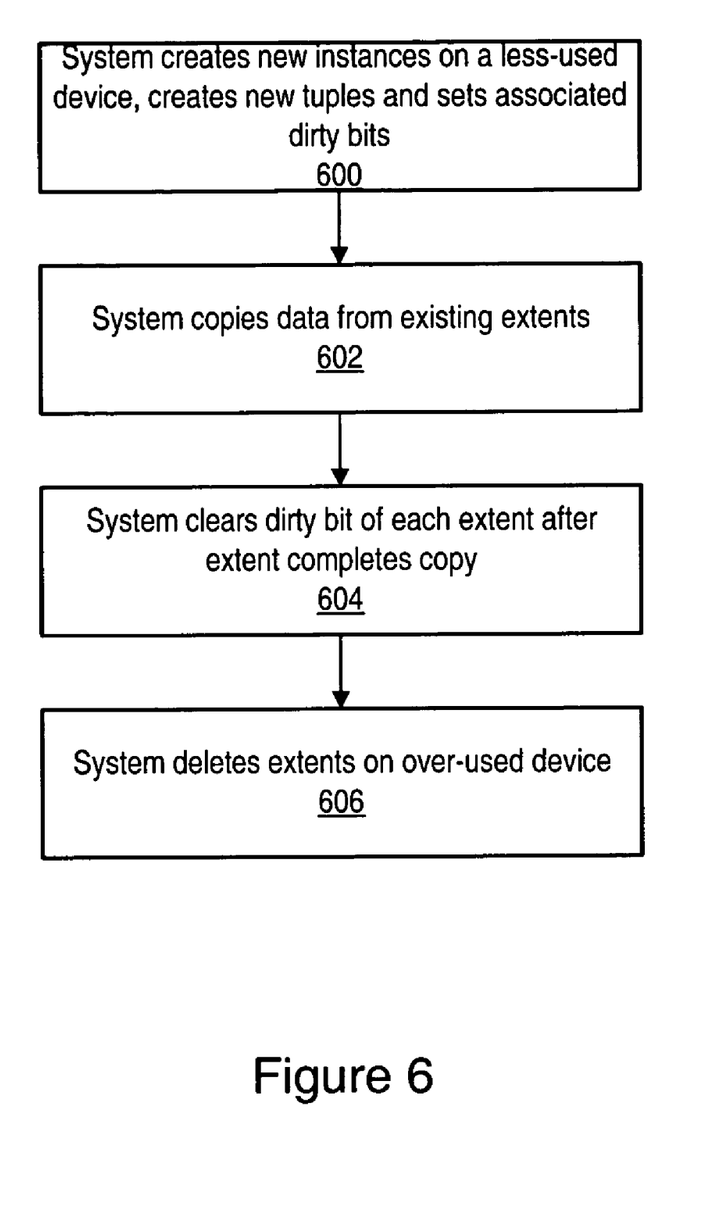
FIG. 6 is a flowchart illustrating one embodiment of a method for migrating a mirror extent.

FIG. 6 illustrates a method for migrating one or more instances of a set of high-demand data blocks from a hot storage device 250 to a cooler storage device 250. In step 600, file system 150 creates new instances of the high-demand data blocks on a cooler storage device or devices 250, creates additional tuples in the mirror extents 220 associated with the high-demand data blocks, and sets the associated dirty bits. In step 602, file system 150 copies data from original instances of the high-demand data blocks to the new instances of the data blocks on the cooler device 250. It is noted that in one embodiment, file system 150 may determine if a second copy of the high-demand data blocks already exists on a cooler storage device 250, since copying of the data from a cooler storage device 250 may avoid further exacerbation of the hot spot problem.

In step 604, file system 150 clears each dirty bit associated with a new instance as the copy operation for that instance completes. In step 606, file system 150 deletes the original instances of the high-demand data block on the hot storage device 250, as well as the tuples pointing to the original instances, thereby decreasing the number of data accesses to the hot storage device 250 and allowing the device to cool down.

It is noted that in some embodiments, file system 150 may skip step 606 and leave the original instances of the high-demand data blocks on the hot storage device 250, thereby decreasing the likelihood of heating up other storage devices 250 with new instances of the high-demand data blocks. It is further noted that by allowing specific data blocks to be migrated, rather than entire files, the method of FIG. 6 may allow file accesses to be distributed at a finer granularity across a plurality of storage devices 250.

It is additionally noted that in one embodiment, the method described above in FIG. 6 may be used to reorganize data on a given storage device 250 by migrating sets of data blocks to different locations within the storage device 250. In one embodiment, file system 150 may create additional instances of a set of data blocks within a storage device 250 while the original instance is moved, while in another embodiment file system 150 may create an instance of a set of data blocks on another storage device 250 while the original instance is moved.

It is further noted that any of the embodiments described above may further include receiving, sending or storing instructions and/or data that implement the operations described above in conjunction with FIGS. 1-6 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   one or more processors;
   a storage medium that stores program instructions executable by the one or more processors to implement a file system including a first file and a first inode for the first file, wherein the file system is configured to:
   store in the first inode a starting address for a first set of data blocks of the first file;
   store in the first inode starting addresses for two or more sets of mirror data blocks, wherein each set of mirror data blocks mirrors the first set of data blocks of the first file;
   store in the first inode a respective dirty indicator corresponding to each set of the two or more sets of mirror data blocks; and
   perform a write operation to write particular data to the first file, wherein performing the write operation includes performing the following for each respective set of mirror data blocks:
   initiating writing of the particular data to the respective set of mirror data blocks;
   setting the respective dirty indicator corresponding to the respective set of mirror data blocks in response to initiating the write operation, wherein setting the respective dirty indicator indicates that the particular data has not yet been successfully written to the respective set of mirror data blocks;
   clearing the respective dirty indicator corresponding to the respective set of mirror data blocks in response to determining that the particular data was successfully written to the respective set of mirror data blocks, or otherwise leaving the respective dirty indicator set if the particular data cannot be successfully written to the respective set of mirror data blocks;

wherein the file system is further configured to:
  subsequently to performing the write operation, determine that a particular dirty indicator corresponding to a particular set of the two or more sets of mirror data blocks is set;
  resynchronize the particular set of mirror data blocks with one or more other sets of mirror data blocks in response to determining that the particular dirty indicator is set; and
  clear the particular dirty indicator after resynchronizing the particular set of mirror data blocks with the one or more other sets of mirror data blocks.

2. The system of claim 1, wherein the file system is further configured to store a file name corresponding to the first file in the first inode.

3. The system of claim 1, further comprising a plurality of storage devices,
  wherein said first set of data blocks is stored on a first of said plurality of storage devices, and
  wherein the two or more sets of mirror data blocks includes a particular set of mirror data blocks stored on a second of said plurality of storage devices.

4. The system of claim 3, wherein at least one of the storage devices is a remote network device.

5. The system of claim 3, wherein said file system is configured to
  detect that said second of said plurality of storage devices is receiving a disproportionate number of data accesses,
  in response to detecting said disproportionate number of data accesses:
    move the particular set of mirror data blocks from the second of said plurality of storage devices to a third of said plurality of storage devices.

6. The system of claim 1, wherein each set of mirror data blocks corresponds to a mirror extent.

7. The system of claim 1,
  wherein the first inode is used to access the first set of data blocks and the two or more sets of mirror data blocks without requiring another inode to be accessed.

8. The system of claim 1,
  wherein the write operation to the first file is requested by a calling routine;
  wherein the write operation to the first file is a synchronous write operation that waits to return to the calling routine until after the writing of the particular data to each set of the two or more sets of mirror data blocks has been completed.

9. The system of claim 1,
  wherein the write operation to the first file is requested by a calling routine;
  wherein the write operation to the first file is an asynchronous write operation that returns to the calling routine before writing of the particular data to one or more of the two or more sets of mirror data blocks has been completed.

10. A method comprising:
  storing in a first inode for a first file a starting address for a first set of data blocks of the first file,
  storing in the first inode starting addresses for two or more sets of mirror data blocks, wherein each set of mirror data blocks mirrors the first set of data blocks,
  storing in the first inode a respective dirty indicator corresponding to each set of the two or more sets of mirror data blocks, and
  performing a write operation to write particular data to the first file, wherein performing the write operation includes performing the following for each respective set of mirror data blocks:
    initiating writing of the particular data to the respective set of mirror data blocks;
    setting the respective dirty indicator corresponding to the respective set of mirror data blocks in response to initiating the write operation, wherein setting the respective dirty indicator indicates that the particular data has not yet been successfully written to the respective set of mirror data blocks, and
    clearing the respective dirty indicator corresponding to the respective set of mirror data blocks in response to determining that the particular data was successfully written to the respective set of mirror data blocks, or otherwise leaving the respective dirty indicator set if the particular data cannot be successfully written to the respective set of mirror data blocks;

wherein the method further comprises:
  subsequently to performing the write operation, determining that a particular dirty indicator corresponding to a particular set of the two or more sets of mirror data blocks is set;
  resynchronizing the particular set of mirror data blocks with one or more other sets of mirror data blocks in response to determining that the particular dirty indicator is set; and
  clearing the particular dirty indicator after resynchronizing the particular set of mirror data blocks with the one or more other sets of mirror data blocks.

11. The method of claim 10, further comprising storing a file name corresponding to the first file in the first inode for the first file.

12. The method of claim 10,
  wherein said first set of data blocks is stored on a first of a plurality of storage devices, and
  wherein the two or more sets of mirror data blocks includes a particular set of mirror data blocks stored on a second of said plurality of storage devices.

13. The method of claim 12, wherein at least one of the storage devices is a remote network device.

14. The method of claim 12, further comprising:
  detecting that said second of said plurality of storage devices is receiving a disproportionate number of data accesses, and
  in response to detecting said disproportionate number of data accesses:
    moving the particular set of mirror data blocks from the second of said plurality of storage devices to a third of said plurality of storage devices.

15. The method of claim 10, wherein each set of mirror data blocks corresponds to a mirror extent.

16. The method of claim 10,
  wherein the first inode is used to access the first set of data blocks and the two or more sets of mirror data blocks without requiring another inode to be accessed.

17. A computer readable memory medium including program instructions executable to implement:
  storing in a first inode for a first file a starting address for a first set of data blocks of the first file,
  storing in the first inode starting addresses for two or more sets of mirror data blocks, wherein each set of mirror data blocks mirrors the first set of data blocks,
  storing in the first inode a respective dirty indicator corresponding to each set of the two or more sets of mirror data blocks, and performing a write operation to write particular data to the first file, wherein performing the write operation includes performing the following for each respective set of mirror data blocks:
  initiating writing of the particular data to the respective set of mirror data blocks;
  setting the respective dirty indicator corresponding to the respective set of mirror data blocks in response to initiating the write operation, wherein setting the respective dirty indicator indicates that the particular data has not yet been successfully written to the respective set of mirror data blocks, and
  clearing the respective dirty indicator corresponding to the respective set of mirror data blocks in response to determining that the particular data was successfully written to the respective set of mirror data blocks, or otherwise leaving the respective dirty indicator set if the particular data cannot be successfully written to the respective set of mirror data blocks;
wherein the program instructions are further executable to implement:
  subsequently to performing the write operation, determining that a particular dirty indicator corresponding to a particular set of the two or more sets of mirror data blocks is set;
  resynchronizing the particular set of mirror data blocks with one or more other sets of mirror data blocks in response to determining that the particular dirty indicator is set; and
  clearing the particular dirty indicator after resynchronizing the particular set of mirror data blocks with the one or more other sets of mirror data blocks.

18. The computer readable memory medium of claim 17, wherein the first inode includes a file name corresponding to the first file.

19. The computer readable memory medium of claim 17,
  wherein said first set of data blocks is stored on a first of a plurality of storage devices, and
  wherein the two or more sets of mirror data blocks includes a particular set of mirror data blocks stored on a second of said plurality of storage devices.

20. The computer readable memory medium of claim 19, wherein at least one of the storage devices is a remote network device.

21. The computer readable memory medium of claim 19, wherein program instructions are further executable to implement:
  detecting that said second of said plurality of storage devices is receiving a disproportionate number of data accesses, and
  in response to detecting said disproportionate number of data accesses:
    moving the particular set of mirror data blocks from the second of said plurality of storage devices to a third of said plurality of storage devices.

22. The computer readable memory medium of claim 17, wherein each set of mirror data blocks corresponds to a mirror extent.

23. The computer readable memory medium of claim 17, wherein the first inode is used to access the first set of data blocks and the two or more sets of mirror data blocks without requiring another inode to be accessed.

\* \* \* \* \*